United States Patent Office 3,411,542
Patented Nov. 19, 1968

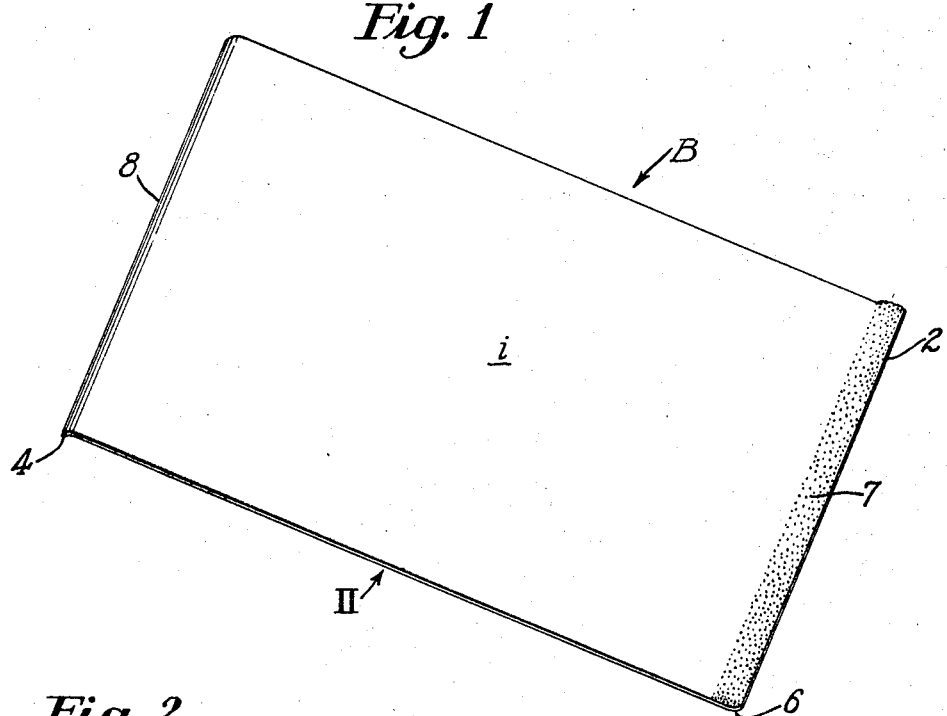
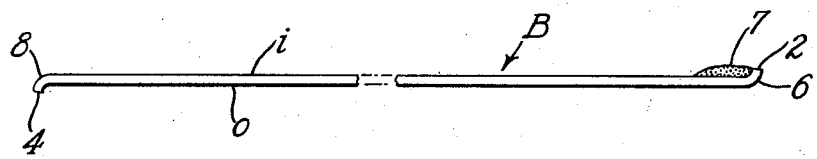
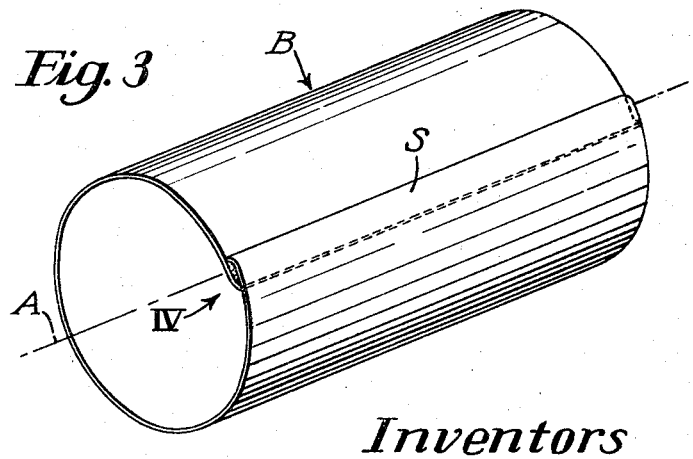
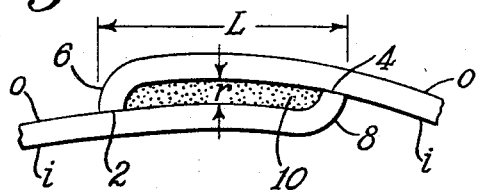
Inventors
John E. Walsh
Frederick S. Sillars
By their Attorney
Richard G. Wise

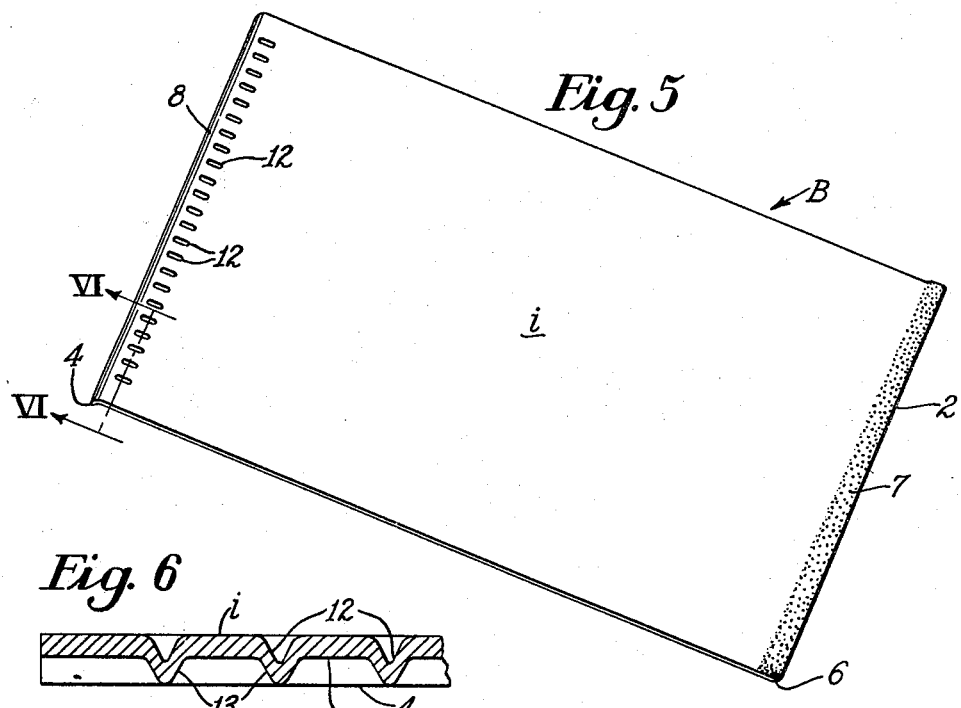
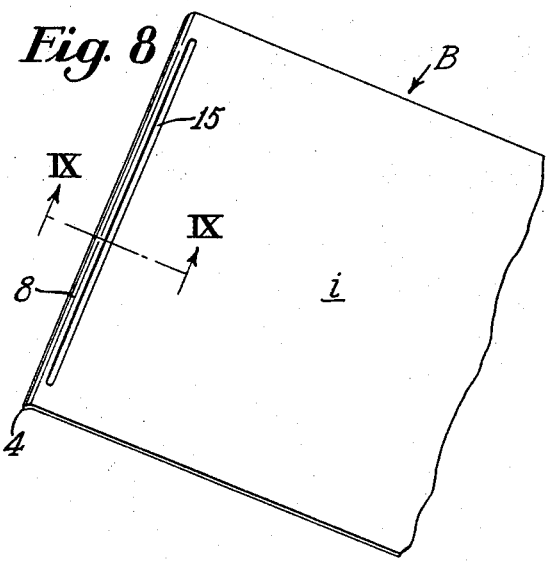
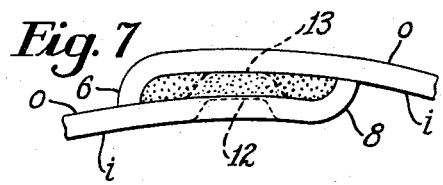
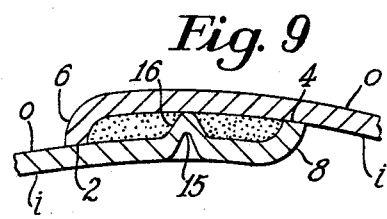
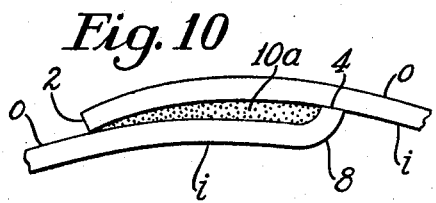
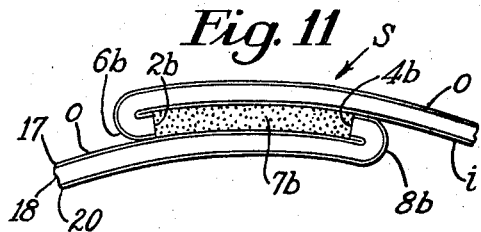

3,411,542
LAP SEAMED TUBULAR CONTAINER BODIES AND METHOD FOR MAKING SAME
John E. Walsh and Frederick S. Sillars, Beverly, Mass., assignors to United Shoe Machinery Corporation, Boston, Mass., a corporation of New Jersey
Filed May 17, 1965, Ser. No. 456,322
14 Claims. (Cl. 138—170)

ABSTRACT OF THE DISCLOSURE

A lap seam container body and a method of making it are disclosed, the body comprising a tube of sheet material with opposite marginal portions of the sheet formed into a side seam of overlapping layers, the edge of at least one of the layers being deflected toward and engageable with the other layer along a line spaced from the edge of said other layer to create a circumferentially elongated separation having a relatively substantial transaxial width between the layers. Adhesive material in the separation between the overlapping layers seals the seam.

---

This invention relates to tubular container bodies and more particularly to bodies having longitudinally extending side seams of overlapping or lap type construction.

Conventional "tin cans" are made commercially in large quantity by forming, from an initially flat rectangular blank, a tubular body (usually cylindrical) having a side seam made by overlapping and interlocking two opposite parallel margins of the rectangular blank and then soldering the interlocked margins to seal the seam. Interlocking construction is usually empoyed only on all metal bodies. Composite body stock, on the other hand, i.e. that formed from sheets of metal foil and plastic or fibrous board stock such as chip board, does not readily lend itself to the formation of an interlocked seam, or lock seam as it is also called, but when used for containers is almost exclusively employed in wound bodies or those formed by a non-locked or lap type seam.

A lap seam generally comprises little more than the two overlapping marginal layers of the tubular container secured by solder, cement or other adhesive material. It is to the lap type seam construction that this invention is directed, whether the container body be made of tin plated steel, i.e. tin plate, aluminum or other metal or made of composite or even all fibrous body stock.

Although, some all metal tubular can bodies have been made with lap seams instead of the conventional lock seams and have been sealed by adhesives, they are expensive and have not enjoyed much commercial success to date. Applicants have found that the overlapping portions of a can body having all or substantially all of its side seam of lap construction can be adhesively secured and the resulting seam is as strong or stronger than one having a conventional soldered lock seam at lower cost, thereby offering good hopes of commercial success.

Accordingly, one of the objects of this invention is to produce an improved inexpensive tubular container body having a lap type side seam which is sealed by adhesive.

Another object of this invention is to provide a tubular container body which may be made entirely from metal stock, e.g. tin plate, and which has a lap type side seam sealed by organic adhesive or solder.

Still another object of this invention is to produce a tubular container body having a lap seam sealed by an organic adhesive or solder, the seam having a bursting strength equal to or greater than can bodies formed with soldered lock seams.

Applicants have found that a container body made of tin plate, nonferrous body stock or metal-fiber or metal-plastic laminate body stock may be effectively joined by a lap seam and sealed by organic adhesives such as strong thermoplastic adhesives, for example, those based on polyesters or polyamides which may, if desired, contain curing components (as well as a body made of tin plate joined by a lap seam and sealed by solder) provided the thickness of the adhesive cement or solder between the overlapping layers of the seam is maintained within a prescribed range which will produce maximum strength.

In the more popular sizes of tin cans such as the No. 2 or even cans of larger size (since the gauge of the body stock and the configurations of the seams are generally the same) the circumferential dimension of the side seam, i.e. the width of the metal layers in overlapping relationship, is about ¼″ and it has been found that with such adhesive materials the transaxial or radial thickness of the cement should be in the order of magnitude of .001″ to .015″.

Accordingly, another object of this invention is to provide a tubular container body having a side seam which is predominately of lap construction in which the thickness of adhesive between the overlapping layers of the side seam is controlled within the order of magnitude of .001″ to .015″ to provide maximum strength.

Still another object of this invention is to provide a tubular container body having a lap seam sealed by an adhesive which seam has increased column strength as well as added strength transaxially of the body.

Yet another object of this invention is to provide a method of making a tubular container body in accordance with the various foregoing objects.

As a feature of this invention and in accordance with the various objects thereof there is provided a tubular container body having a longitudinally extending side seam formed principally of overlapping layers of the body stock secured by a layer of adhesive the thickness of which measured in a direction transaxially or generally radially of the tubular body is between .001″ and .015″. To obtain the desired thickness of adhesives between layers, selected portions, particularly the edges of the overlapping layers of body stock, are bent, burred or otherwise deflected transaxially or generally radialy of the tubular body to provide linear contact between such selected deflected portions and the body creating thereby an elongated gap extending the length of the lap seam. Thus, the major area of the overlapping layers forming the seam are spaced from each other by an amount equal to the radial or transaxial dimension of the deflected portion of the layers. The gap between the overlapping layers of the finished seam is filled with adhesive material. This may be accomplished by coating one or both opposite margins of the flat body stock with adhesive either before or after deflection of the edges and subsequently reactivating the adhesive in assembling the layers when the stock is in tubular form or by applying adhesive directly during the assembly of the seam. This construction adds considerably to both the compressive and column strength of the seam and produces an economic container.

The above and other features of the invention including various novel details of construction and combinations of parts will now be more particularly described with reference to the accompanying drawings and pointed out in the claims. It will be understood that the particular container bodies embodying the invention are shown by way of illustration only and not as limitations of the invention. The principles and features of this invention may be employed in varied and numerous embodiments without departing from the scope of the invention.

In the drawings,

FIG. 1 is a perspective view of a sheet used in making container bodies in accordance with this invention;

FIG. 2 is an edge view of the sheet shown in FIG. 1 taken in the direction of the arrow II;

FIG. 3 is a perspective view of a partially completed tubular container body made from the sheet shown in FIG. 1;

FIG. 4 is an edge view of the seam of the container body of FIG. 3 taken in the direction of the arrow IV;

FIG. 5 is a view similar to FIG. 1 of a sheet employed in an alternative construction embodying the invention;

FIG. 6 is a sectional view taken along the line VI—VI of FIG. 5;

FIG. 7 is an edge view similar to FIG. 4 of the seam of a partially completed tubular container body made from the sheet shown in FIG. 5;

FIG. 8 is a perspective view similar to FIGS. 1 and 5 of a sheet employed in an alternative construction embodying the invention;

FIG. 9 is a sectional view taken along the line IX—IX of FIG. 8;

FIG. 10 is an edge view similar to FIG. 4 of the seam of a container body embodying another alternative construction; and FIG. 11 is an edge view similar to FIG. 4 of the seam of a container embodying still another alternative construction of this invention.

It will be appreciated that the various drawings are not necessarily scale drawings of either the tubular bodies or components thereof but have been enlarged, modified and portions emphasized to assist in pointing out more clearly the various features of this invention.

FIG. 1 shows a body blank B which initially comprised a flat rectangular sheet of conventional tin plate, i.e. sheet steel plated on both surfaces with tin. The blank also may be of aluminum, other ferrous or nonferrous materials or composite metal and fiber laminates. The adhesive to be illustrated is an organic thermoplastic although the invention applies equally well to solder, cement and other adhesive materials. The upper surface of the blank B, i.e. that which faces the viewer in FIG. 1, is designated surface $i$ and the lower or opposite surface is designated $o$. They are so designated since these are the surfaces which will ultimately constitute the inside and outside of the tubular body. The rectangular blank has opposite parallel edges 2 and 4. These edges are mutually deflected away from each other and thus away from opposite surfaces of the sheet by bending or burring to provide displaced marginal portions 6 and 8 (seen in end view in FIG. 2). The edge 2 is deflected away from the surface $o$ from .001″ to .015″ which, of course, is in addition to the thickness of the blank B and the edge 4 deflected away from the surface $i$ the same amount. Bending, burring or deflecting the edges may be accomplished in any suitable manner, as by placing the sheet on a firm support such as a flat block of steel, extending the sheet over the edge by the amount of deflection desired, pressing a blunt tool against the edge and moving the tool lengthwise of the edge. The sheet may be moved while the tool remains stationary. Organic thermoplastic adhesive of the type mentioned above is applied in a band 7 about ¼″ wide to one or both margins beginning at the edges 2 and/or 4 of the concave surfaces of the deflected portions 6 and/or 8. This may be done either before or after deflection is completed.

To form the body, the blank B is bent or curved into tubular configuration (usually but not necessarily cylindrical) about a central longitudinal axis A (FIG. 3) and overlapping the opposed parallel edges 2 and 4 and their adjacent marginal bands (either or both of which have been adhesively coated) into a lap seam S. The amount of overlap (designated generally as L in FIG. 4) is approximately ¼″ measured circumferentially of the body. In its tubular configuration the edge 2 engages the outer surface $o$ of the body and the edge 4 engages the inner surface $i$. The seam is then held together and heat is applied to reactivate the adhesive. Upon cooling the seam S is completely sealed. The deflected portions 6 and 8 effectively confine the adhesives within the overlapping layers.

If preferred, the adhesive 7 may be extruded in liquid form into the gap 10 (FIG. 4) between the overlapping layers after the sheet is formed into tubular configuration rather than precoating the margins of the blank B.

Thus, the transaxial or radial dimension $r$ (FIG. 4) between the overlapping layers, which determines the thickness of the adhesive, is the same as the transaxial dimensions or amount of deflection of the portions 6 and 8. Since the amount of initial deflection was from .001″ to .015″ in excess of the thickness of the blank B and since the pressure on the seam while the adhesive is either reactivated or extruded does not flatten out the deflected edges appreciably, the thickness of adhesive in the finished seam is from .001″ to .015″.

An alternative construction will be seen in FIGS. 5 through 7. Adjacent the deflected margin 8 of the rectangular body blank B is a series of spaced elongated depressions 12 formed in either surface but preferably the surface $i$ which produce a series of corresponding bulges or ribs 13 projecting from the opposite surface $o$ as seen in FIG. 6. When the blank B is formed into tubular configuration, the end of which is seen in FIG. 7, the ribs 13 projecting from the surface $o$, if the same height as the deflected portions 6 and 8, engage the surface $i$ of the overlapping layer and reinforce the seam. The ribs add to the compressive strength of the seam whether or not they engage the surface $i$. Whereas, the ribs 13 are herein disclosed as uniformly spaced and in close relationship they may also be spaced a greater distance apart or staggered. Furthermore, they may be in the form of raised dots uniformly or irregularly spaced adjacent the edge 4.

FIGS. 8 and 9, show another form of container body made in accordance with this invention. A trough or depression 15 is formed in either, but preferably the surface $i$, parallel to the deflected portion 8 adjacent the edge 4 of the body B. Depressing the surface $i$ results in an elongated rib 16 (FIG. 9) extending from the surface $o$, which rib when the body blank is overlapped, as shown in FIG. 9, may, if desired, engage the surface $i$ between the deflected edges 2 and 4.

As in the previously mentioned embodiments the height of the rib 16 may equal that of the deflected portions 6 and 8 adding not only to the transaxial or compressive strength of the seam S but also to its column strength and further contributing to the control of the thickness of the adhesive 7 between the layers.

Another construction is shown in FIG. 10 wherein only one of the edges, i.e. edge 4, has been deflected to create the displaced marginal portion 8. The edge 2 has not been deflected. Consequently, whereas the space 10a between the overlapping layers of the seam is not uniform in cross section measured circumferentially of the can, a substantial portion of the overlapping layer, i.e. from the portion 8 almost to the edge 2, is effectively spaced to create the desired .001″ to .015″ layers of adhesive. Since the edge 2 is not deflected it produces a somewhat smoother external surface on the body which may be desirable under certain circumstances.

Next referring to FIG. 11 there is disclosed a lap seam S of a container body made in accordance with another embodiment of this invention enlarged to show the composition of tin plate. The body stock has a coating of tin 17, the main or inner layer of steel 18 and a second or opposite layer of tin 20. The edge 4b is not only deflected away from the surface $i$ but is turned over on itself whereby the edge of the steel 18 is exposed to and coated by the adhesive 7b between the layers. This construction effectively eliminates the possibility of the steel rusting by contact with liquid, particularly acid contents of the container. Correspondingly, the edge 2b may also be prevented from rusting in the same manner. This edge is not only deflected away from the surface o but also is turned over on itself to be exposed to the adhesive layer 7b. This prevents rusting occurring at the outer edge of the seam S by contact with extended elements. The transaxial or radial dimension of the layer of adhesive is maintained at the desired size in the same manner as in the previous examples.

This same principle is applicable to metal fiber laminates. Were the outer layers 17 and 20 aluminum and the inner layer 18 fibrous material such as chip board, the condition known as wicking would be eliminated. Wicking is the absorbing of liquid by the fibrous layer. Both of the "raw" edges 2b and 4b being covered by the adhesive, liquid either from the contents of the container or on the outside cannot touch the figrous inner layer.

While the various embodiments of this invention have been illustrated and described with reference to container bodies having lap seams only, it is to be understood that the invention lends itself particularly well to seams which are predominately lap type but having limited portions interlocked.

Having thus described our invention, what we claim as new and desire to secure by Letters Patent of the United States is:

1. A container body comprising a tube of sheet material with opposite marginal portions of the sheet forming a side seam of overlapping layers, the edge of at least one of the layers being deflected toward and engageable with the other layer along a line spaced from the edge of said other layer to create a circumferentially elongated separation having a relatively substantial transaxial width between the layers, and adhesive material in the separation between the layers to seal the spaced overlapping layers which form the seam.

2. A container body comprising a tube of sheet material with opposite marginal portions of the sheet forming a side seam of overlapping layers, the edge of at least one of the layers being deflected .001" to .015" toward and engageable with the other layer along a line spaced from the edge of said other layer to create a circumferentially elongated separation having a relatively substantial transaxial width between the layers, and adhesive material in the separation between the layers to seal the spaced overlapping layers which form the seam.

3. A container body comprising a tube of sheet material with opposite marginal portions of the sheet forming a side seam of overlapping layers, the edge of each layer being deflected toward and engageable with the opposite layer along a line spaced from the edge of said opposite layer to create a circumferentially elongated separation having a relatively substantial transaxial width between the layers, and adhesive material in the separation between the layers to seal the spaced overlapping layers which form the seam.

4. A container body comprising a tube of sheet material with opposite marginal portions of the sheet forming a side seam of overlapping layers, the edge of each layer being deflected .001" to .015" toward and engageable with the opposite layer along a line spaced from the edge of said opposite layer to create a circumferentially elongated separation having a relatively substantial transaxial width between the layers, and adhesive material in the separation between the layers to seal the spaced overlapping layers which form the seam.

5. A container body comprising a tube of sheet material with opposite marginal portions of the sheet forming a side seam of overlapping layers, the edge of each layer being deflected toward and engageable with the opposite layer, a plurality of projections extending from one of the layers between said deflected edges within the overlapping side seam, said edges creating a circumferentially elongated separation having a relatively substantial transaxial width between the layers, and adhesive material in the separation between the layers to seal the spaced overlapping layers which form the seam.

6. A container body comprising a tube of sheet material with opposite marginal portions of the sheet forming a side seam of overlapping layers, the edge of each layer being deflected toward and engageable with the opposite layer, a linear projection extending substantially lengthwise of and within the seam and essentially parallel with said deflected edges, said deflected edges creating a circumferentially elongated separation having a relatively substantial transaxial width between the layers, and adhesive material in the separation between the layers to seal the spaced overlapping layers which form the seam.

7. A container body comprising a tube of sheet material with opposite marginal portions of the sheet forming a side seam of overlapping layers, limited portions of the margins including the edges of each layer being turned back on themselves and engageable with the other layer along a line spaced from the edge of said other layer to create a circumferentially elongated separation having a relatively substantial transaxial width between the layers with said edges facing toward each other, and adhesive material in the separation between the layers to seal the seam and said edges.

8. A method of making a tubular container body having a side seam of overlapping layers comprising the steps of providing a sheet of body material, deflecting the edge of at least one marginal portion of the sheet away from a surface of said sheet, bending the sheet into tubular configuration, placing said marginal portion in spaced overlapping relationship with the opposite marginal portion of the sheet and the deflected edge in engagement with said surface to form a circumferentially elongated separation having relatively substantial transaxial width between the overlapping layers and sealing the seam by adhesive between said overlapping marginal portions which form the separation.

9. A method of making a tubular container body having a side seam of overlapping layers comprising the steps of providing a sheet of body material, deflecting the edge of at least one marginal portion of the sheet .001" to .015" away from a surface of said sheet, bending the sheet into tubular configuration, placing said marginal portion in spaced overlapping relationship with the opposite marginal portion of the sheet and the deflected edge in engagement with said surface to form a circumferentially elongated separation having relatively substantial transaxial width between the overlapping and sealing the seam by adhesive between the overlapping marginal portions which form the separation.

10. A method of making a tubular container body having a side seam of overlapping layers comprising the steps of providing a sheet of body material, deflecting the edges of opposite marginal portions of the sheet away from opposite surfaces of the said sheet, bending the sheet into tubular configuration, placing said marginal portions in spaced overlapping relationship with said deflected edges engageable, one each, with the inner and outer surfaces of the tubular body to form a circumferentially elongated separation having relatively substantial transaxial width between the overlapping layers and sealing said seam with adhesive between said overlapping marginal portions which form the separation.

11. A method of making a tubular container body having a side seam of overlapping layers comprising the steps of providing a sheet of body material, deflecting the edges of opposite marginal portions of the sheet .001" to .015" away from opposite surfaces of the said sheet, bending the sheet into tubular configuration, placing said marginal portions in spaced overlapping relationship with said deflected edges engageable, one each, with the inner and outer surfaces of the tubular body to form a circumferentially elongated separation having relatively substantial transaxial width between the overlapping layers and sealing said seam with adhesive between said overlapping marginal portions which form the separation.

12. A method of making a tubular container body having a side seam of overlapping layers comprising the steps of providing a sheet of body material, deflecting the edges of opposite marginal portions of the sheet away from opposite surfaces of the said sheet, forming a plurality of projections on at least one of said marginal portions, bending the sheet into tubular configuration, placing said marginal portions in spaced overlapping relationship with said projections located within the overlapping side seam formed by said marginal portions and with said deflected edges engageable, one each, with the inner and outer surfaces of the tubular body to form a circumferentially elongated separation having relatively substantial transaxial width between the overlapping layers and sealing said seam with adhesive between said overlapping marginal portions which form the separation.

13. A method of making a tubular container body having a side seam of overlapping layers comprising the steps of providing a sheet of body material, deflecting the edges of opposite marginal portions of the sheet away from opposite surfaces of the said sheet, forming a linear projection on at least one of said marginal portions substantially parallel with its edge, bending the sheet into tubular configuration, placing said marginal portions in spaced overlapping relationship with said linear projection located within the overlapping side seam formed by said marginal portions and with said deflected edges engageable, one each, with the inner and outer surfaces of the tubular body to form a circumferentially elongated separation having relatively substantial transaxial width between the overlapping layers and sealing said seam with the adhesive between said overlapping marginal portions which form the separation.

14. A method of making a tubular container body having a side seam of overlapping layers comprising the steps of providing a sheet of body material, deflecting the edges of opposite marginal portions of the sheet away from opposite surfaces of the said sheet and toward its center, bending the sheet into tubular configuration, placing said marginal portions in spaced overlapping relationship with said deflected edges facing toward each other whereby to form a circumferentially elongated separation having a relatively substantial transaxial width between said overlapping marginal portions forming said said seam and sealing said seam including said edges with adhesive between said overlapping marginal portions.

References Cited

UNITED STATES PATENTS

| 2,876,725 | 3/1959 | Buck et al. | 113—120 |
| 2,967,161 | 1/1961 | Hart | 260—18 |
| 3,066,063 | 11/1962 | Ecklund et al. | 156—203 |
| 3,314,388 | 4/1967 | Davis et al. | 113—120 |
| 1,844,825 | 2/1932 | Seifert | 220—75 |
| 2,424,188 | 7/1947 | Pearson | 220—81 |
| 2,623,444 | 12/1952 | Maier et al. | 156—218 |
| 2,721,041 | 9/1955 | Nerwin | 220—62 |
| 2,814,416 | 11/1957 | Campbell et al. | 113—120 |
| 1,332,932 | 3/1920 | Sussman | 138—171 |
| 1,895,133 | 1/1933 | Quarnstrom | 138—171 |

EARL M. BERGERT, *Primary Examiner.*

R. KILLWORTH, *Assistant Examiner.*